(12) United States Patent
Card et al.

(10) Patent No.: US 10,817,457 B2
(45) Date of Patent: Oct. 27, 2020

(54) SELF IDENTIFICATION AND POLLUTION DETECTION IN USB TYPE-C

(71) Applicant: FAIRCHILD SEMICONDUCTOR CORPORATION, Sunnyvale, CA (US)

(72) Inventors: Robert A. Card, Scarborough, ME (US); Erik Maier, Scarborough, ME (US)

(73) Assignee: FAIRCHILD SEMICONDUCTOR CORPORATION, Phoenix, AZ (US)

(*) Notice: Subject to any disclaimer, the term of this patent is extended or adjusted under 35 U.S.C. 154(b) by 389 days.

(21) Appl. No.: 15/812,716

(22) Filed: Nov. 14, 2017

(65) Prior Publication Data

US 2018/0143674 A1    May 24, 2018

Related U.S. Application Data

(60) Provisional application No. 62/426,147, filed on Nov. 23, 2016, provisional application No. 62/426,033, filed on Nov. 23, 2016.

(51) Int. Cl.
| | | |
|---|---|---|
| *G06F 13/42* | (2006.01) | |
| *G06F 1/20* | (2006.01) | |
| *G06F 1/26* | (2006.01) | |

(52) U.S. Cl.
CPC .......... *G06F 13/4282* (2013.01); *G06F 1/206* (2013.01); *G06F 1/266* (2013.01); *G06F 2213/0042* (2013.01)

(58) Field of Classification Search
USPC ....................................................... 700/299
See application file for complete search history.

(56) References Cited

U.S. PATENT DOCUMENTS

| | | | | |
|---|---|---|---|---|
| 2010/0315752 | A1* | 12/2010 | Rabu .................. | H01R 13/6683 361/103 |
| 2012/0294332 | A1* | 11/2012 | Monks ..................... | G01K 3/14 374/152 |
| 2015/0048804 | A1* | 2/2015 | Toivanen ............... | H02J 7/0036 320/162 |
| 2016/0093960 | A1* | 3/2016 | Chen ....................... | H05K 1/115 361/679.21 |
| 2017/0357803 | A1* | 12/2017 | Amarilio ................... | G06F 1/28 |
| 2018/0074564 | A1* | 3/2018 | Paparrizos .............. | G06F 1/266 |

OTHER PUBLICATIONS

Hewlett-Packard Inc. et al., "USB 3.1 Legacy Cable and Connector Specification," Rev. 1.0, Sep. 22, 2017, 74 pages.

(Continued)

*Primary Examiner* — Md Azad
(74) *Attorney, Agent, or Firm* — Brake Hughes Bellermann LLP

(57) ABSTRACT

A paddle board includes an electronic marker circuit configured to indicate at least one capability of a cable assembly to a device coupled to the cable assembly and to select the device as one of a source or a sink, the paddle board being powered by the device, a register configured to store at least one variable value associated with at least one of the cable assembly and the paddle board, and a temperature sensor configured to sense a temperature of the paddle board and configured to store a value indicating the sensed temperature in the register.

8 Claims, 6 Drawing Sheets

(56) References Cited

OTHER PUBLICATIONS

Apple Inc. et al., Universal Serial Bus Type-C Cable and Connector Specification, Release 1.3, Jul. 14, 2017, 241 pages.
Bob Dunstan et al., "Universal Serial Bus Power Delivery Specification," Rev. 3.0, Ver. 1.1, Jan. 12, 2017, 579 pages.
Hewlett-Packard Company et al., "Universal Serial Bus Type-C™ Port Controller Interface Specification," Rev. 2.0, Ver. 1.0, Oct. 2017, 103 pages.

* cited by examiner

SELF IDENTIFICATION AND POLLUTION DETECTION IN USB TYPE-C

RELATED APPLICATIONS

This application claims priority to and the benefit of U.S. Provisional Application No. 62/426,033, entitled, "TYPE-C EMARKER, DYNAMIC SOP' AND SOP" SELF IDENTIFICATION WITHOUT ADDITIONAL CONDUCTOR," filed Nov. 23, 2016, and claims priority to and the benefit of U.S. Provisional Application No. 62/426,147, entitled, "TYPE-C POLLUTION DETECTION", filed Nov. 23, 2016, both of which are incorporated herein by reference in their entireties.

FIELD

Embodiments relate to a Universal Serial Bus (USB) Type-C reversible cable assembly including a cable and USB Type-C connectors. Embodiments can also relate to other standards that utilize a bi-directional power and data cable assembly having the same connector at each end of a cable.

BACKGROUND

Universal Serial Bus (USB) Type-C is a USB standard that allows for low-voltage, high-current battery charging and/or electronic device powering applications. The USB Type-C specification requires Type-C cable assemblies rated for greater than 3 A charging to have electronic marker circuits (e.g., integrated circuits) integrated within each connector of the cable assembly. Accordingly, each paddle board of the connector includes an electronic marker circuit configured to identify the capability of the cable assembly.

SUMMARY

In at least one general aspect, a paddle board includes an electronic marker circuit configured to indicate at least one capability of a cable assembly to a device coupled to the cable assembly and to select the device as one of a source or a sink, the paddle board being powered by the device, a register configured to store at least one variable value associated with at least one of the cable assembly and the paddle board, and a temperature sensor configured to sense a temperature of the paddle board and configured to store a value indicating the sensed temperature in the register.

In another general aspect, In another general aspect, a cable assembly includes a first paddle board configured to indicate at least one capability of the cable assembly to a first device and select the first device as one of a source or a sink, the first paddle board being powered via a bus voltage and a second paddle board configured to indicate at least one capability of the cable assembly to a second device and select the second device as one of the source or the sink, the second paddle board being powered via the bus voltage excluding a conductor coupled between the first paddle board and the second paddle board.

In yet another general aspect, In yet another general aspect, a paddle board includes an electronic marker circuit configured to indicate at least one capability of a cable assembly to a device coupled to the cable assembly and to select the device as one of a source or a sink, the paddle board being powered via a bus voltage excluding a conductor coupled between the paddle board and another paddle board, a state machine configured to store a variable configuration of the electronic marker circuit, and a register configured to store at least one variable value associated with at least one of the cable assembly and the paddle board.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative positioning of regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

A reversible cable assembly (e.g., Universal Serial Bus (USB) Type-C cable) can be configured to be reversibly coupled to a source (e.g., a power source) or a sink (e.g., a load). This enables ease of use because an end-user can plug either end (e.g., connector or plug) of the cable assembly into either the source of the sink. The cable assemblies described herein include a combination of elements that are more efficient in operation, easier to implement, smaller in size, and/or so forth compared with known cable assemblies.

Figure 1:
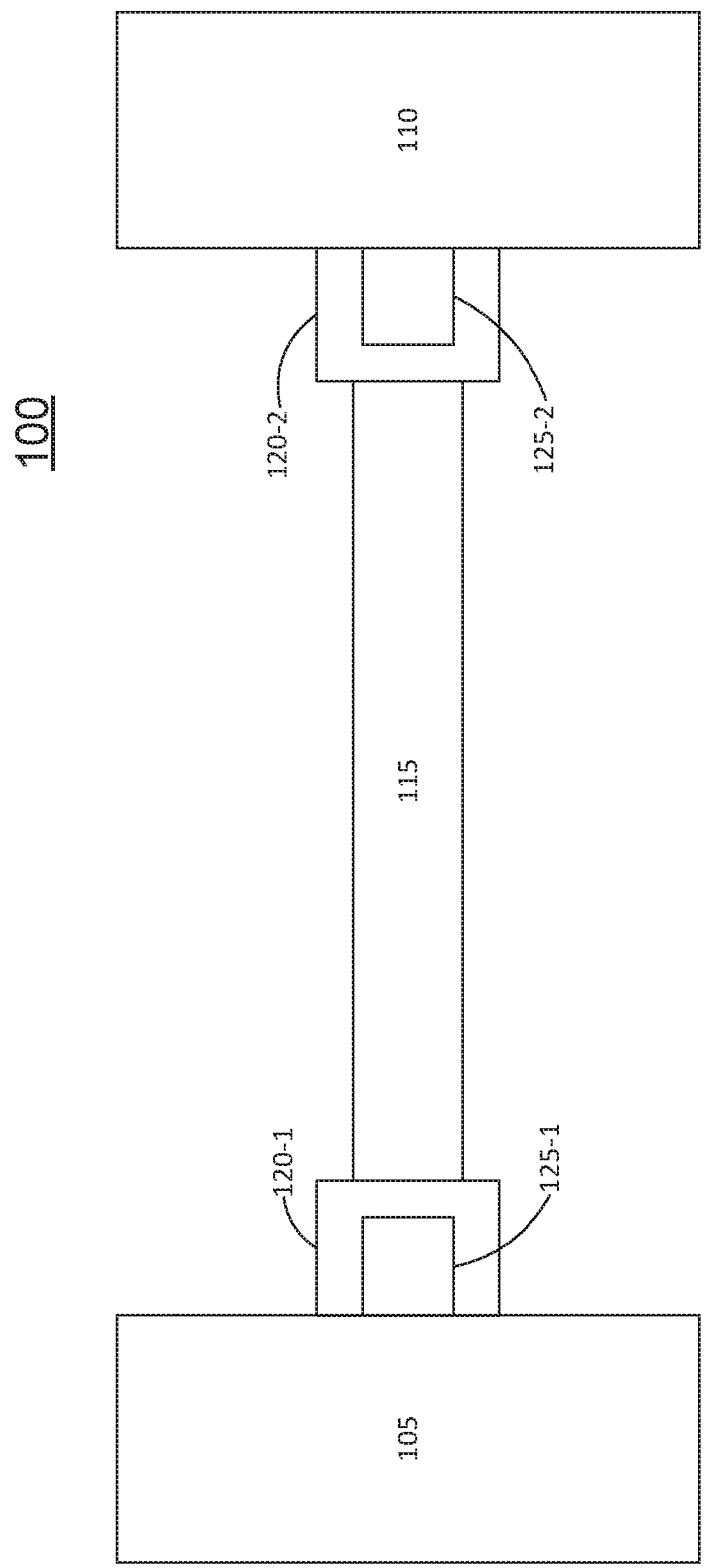
FIG. 1 is a high level block diagram illustrating a USB Type-C system according to at least one example embodiment.

FIG. 1 illustrates a block diagram of a USB Type-C system 100 including a source 105, a sink 110, and a cable assembly 115 coupling the source 105 and the sink 110. The source 105 is a device providing power (e.g., a power source) and can include a travel adapter (TA), a portable battery, a device including a battery or the like. The sink 110 is a device receiving power and can include a mobile electronic device, such as a phone or other electronic device having a battery.

The cable assembly 115 is a reversible cable assembly. For example, the cable assembly 115 has two ends 120-1, 120-2 (e.g., USB Type-C connectors) either of which can be connected to the source 105 or the sink 110. Further, the USB Type-C standard includes defining plugs and receptacles that are reversible. The cable assembly 115 includes a plurality of conductors (e.g., wires) extending between the source 105 and the sink 110 ends of the cable assembly 115. The plurality of conductors include, at least, a USB bus power (VBUS) conductor, a configuration channel (CC) conductor, and return path (GND) conductor. Each end 120-1, 120-2 includes a paddle board 125-1, 125-2 configured to indicate at least one capability of the cable assembly 115 to a device (e.g., the source 105, the sink 110) coupled to the cable assembly and to select the device as one of the source 105 or the sink 110.

In at least one example embodiment, the paddle board 125-1, 125-2 can be in approximate thermal equilibrium with a receptacle on the source 105 and/or sink 110. Therefore, due to the thermal characteristics of USB charging systems, temperature sensing during charging can be performed in the cable assembly 115 (e.g., at least one of the two ends 120-1, 120-2). This configuration can detect or sense temperature (e.g., temperature changes) more quickly as compared to temperature detection in either the source 105 or the sink 115. For example, heat is more slowly added to and/or dissipated from the source 105 or the sink 115 as compared to the cable assembly 115 because of, for example, the mass or size differences of the source 105 or the sink 115 as compared to a cable assembly 115. Therefore, this example embodiment can detect over temperature conditions more quickly than systems that only include temperature sensors in a device (e.g., source 105 or sink 110).

The USB Type-C specification states that all Type-C cables rated for greater than 3 A charging are to have electronic marker (Emarker) circuits (e.g., integrated circuits) configured to identify at least one capability (e.g., current capacity, voltage rating) of the cable assembly 115. A cable assembly can include a conductor between the source-side electronic marker and the sink-side electronic marker used for communicating identification information. Further, the source-side electronic marker can receive power from the source and the sink-side electronic marker can receive power from the source-side electronic marker through the conductor.

Figure 2:
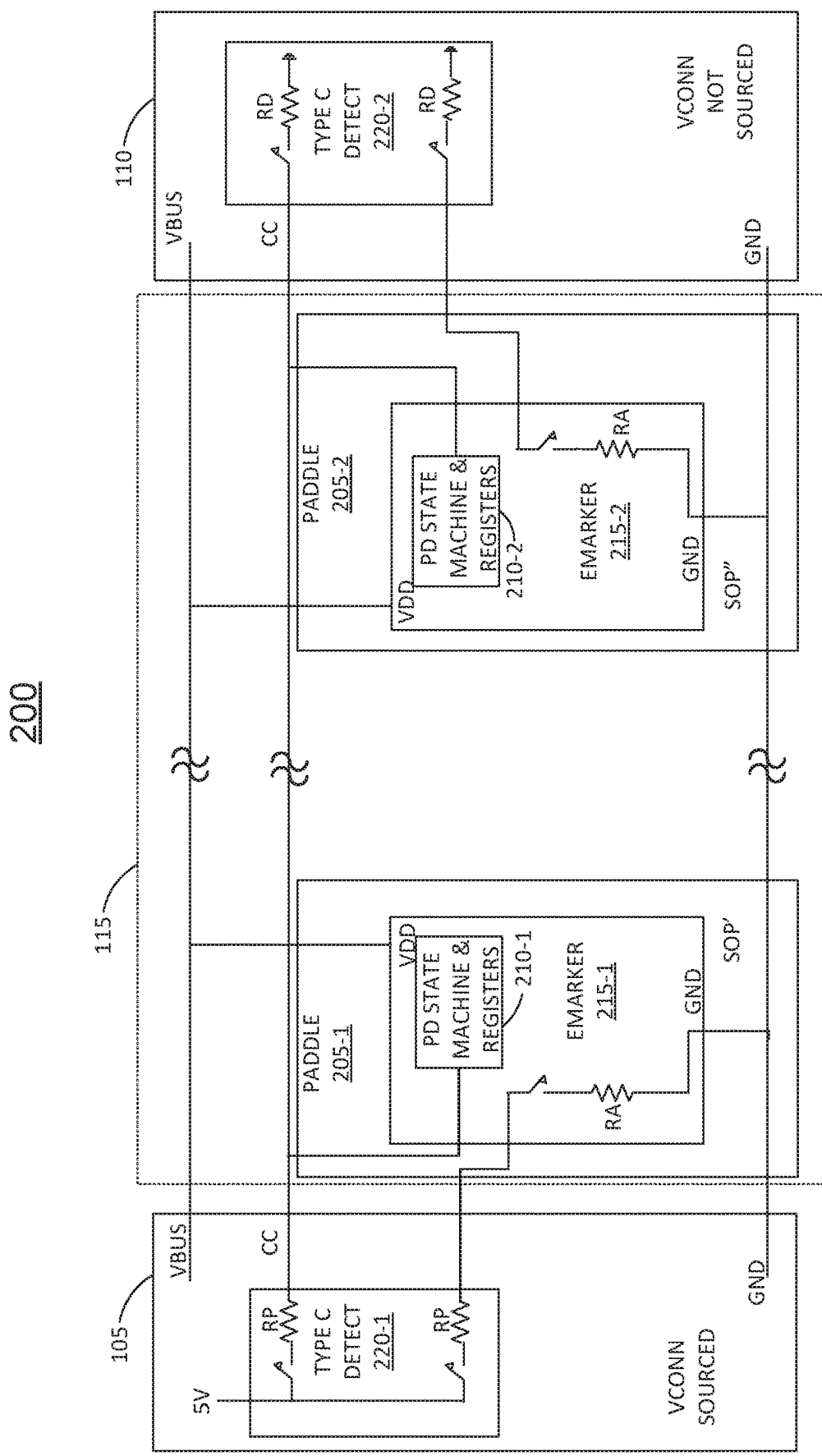
FIG. 2 is a block diagram illustrating a USB Type-C system including a USB Type-C cable assembly that does not include an additional conductor used for power sharing, and/or communication between a source and a sink according to at least one example embodiment.

FIG. 2 is a block diagram illustrating a USB Type-C system 200 according to at least one example embodiment. In the example embodiment shown in FIG. 2, the USB Type-C cable assembly 115 does not include an additional conductor used for power sharing, and/or communication between a source-side and a sink-side electronic marker circuit (hereinafter referred to as an additional conductor). As such each of the source and sink-side electronic marker circuits can identify themselves (e.g., to the source or the sink) without information from or about the other electronic marker circuit. Accordingly, cable assembly 115 excludes the additional conductor and the start of packet (SOP) signaling excludes communicating messages over the additional conductor.

In this example embodiment, the additional conductor is removed. By removing the additional conductor, the manufacturing process of the cable assembly and the electronic marker are more efficient. For example, at least one less conductor is used in the manufacture of the cable assembly. Therefore, the additional conductor is not coupled (usually a manual soldering process) to a paddle board. Further, the electronic marker does not include isolation circuitry to prevent power leakage from the sink-side electronic marker circuit to the source-side electronic marker circuit. Accordingly, fewer components in the paddle board. Thus, fewer components to solder, quality test and the like.

As shown in FIG. 2, the USB Type-C system 200 includes the source 105, the sink 110, and a cable assembly 115 coupling the source 105 and the sink 110. The cable assembly 115 includes a plurality of conductors (e.g., wires) extending between the source 105 and the sink 110 ends of the cable assembly. The plurality of conductors include, at least, a USB bus power (VBUS) conductor, a configuration channel (CC) conductor, and return path (GND) conductor.

The source 105 includes a type-C detect 220-1 and the sink 110 type-C detect 220-2. Type-C detect 220-1, 220-2 can be configured to indicate a device as a source or a sink. For example, type-C detect 220-1 includes a pair of switches coupled to a low voltage (e.g., 2V, 3V, 4V, 5V and the like) power source. Type-C detect 220-2 is not coupled to a low voltage power source. Accordingly, type-C detect 220-1 can indicate that type-C detect 220-1 is a source; whereas, type-C detect 220-2 can not indicate that type-C detect 220-2 is a source. Although not shown, the source 105 and the sink 110 can each include a receptacle (e.g. a USB Type-C receptacle) configured to receive a plug (e.g., a USB Type-C plug) of the cable assembly 115.

The cable assembly 115 further includes a paddle board (PADDLE) 205-1, 205-2 at each end (e.g., in a connector at each end). The USB Type-C specification states that all Type-C cables rated for greater than 3 A charging are to have electronic marker (Emarker) circuits (e.g., integrated circuits) configured to identify at least one capability (e.g., current capacity, voltage rating) of the cable assembly 115. Accordingly, each paddle board 205-1, 205-2 includes an electronic marker (EMARKER) circuit 215-1, 215-2. In this example, each of the source 105 electronic marker circuit 215-1 and the sink 110 side electronic marker circuit 215-2 can receive power from VBUS (e.g., 5-20V). By contrast, in a typical system, the sink 110 side electronic marker circuit 215-2 would receive power from the source 105 electronic marker circuit 215-1 via an additional conductor in a typical Type-C cable assembly. The additional conductor being coupled between the source 105 electronic marker circuit 215-1 and the sink 110 side electronic marker circuit 215-2.

After attachment to a device (e.g., coupling the source 105 to the sink 110 via cable assembly 205), a start of packet (SOP) sequence can commence. During the SOP sequence, the source 105 can apply VCONN (e.g., 5V), while the sink 110 does not apply VCONN. This identifies the source 105 as the source (e.g., the target of packet type SOP') and the sink 110 as the sink (e.g., the target of packet type SOP"). The paddle board 210-1, 210-2 and/or the electronic marker circuit 215-1, 215 is configured to identify itself as a start of packet type SOP', SOP" without using information about the other of the paddle board 210-1, 210-2 and/or the electronic marker circuit 215-1, 215-2. By contrast, in a typical system, the sink 110 side electronic marker circuit 215-2 would share or communicate information over an additional conductor in a typical Type-C cable assembly. The additional conductor being coupled between the source 105 electronic marker circuit 215-1 and the sink 110 side electronic marker circuit 215-2.

Further, if an electronic marker detects VCONN, that electronic marker can identify itself (latch) as SOP'. If the electronic marker does not detect VCONN, that electronic marker can identify itself (latch) as SOP". In the implementation shown in FIG. 2, source 105 side electronic marker 215-1 is identified as SOP' and sink 110 side electronic marker 215-2 is identified as SOP". Accordingly, electronic marker 215-1 will be configured to receive packets marked as SOP' (and ignore packets marked as SOP") and electronic marker 215-2 will be configured to receive packets marked as SOP" (and ignore packets marked as SOP') that are communicated over the CC conductor.

In an example implementation, after attachment to a device (e.g., coupling the source 105 to the sink 110 via cable assembly 115), if an electronic marker detects both VBUS and VCONN (e.g., 50 ms, after power on reset (POR)), that electronic marker can identify itself as SOP' (e.g., while receiving VCONN, for a predetermined time period, or the electronic marker can latch to that state until a subsequent detach or POR). After attachment to a device (e.g., coupling the source 105 to the sink 110 via cable assembly 115), if an electronic marker detects only VBUS, and not VCONN (e.g., no VCONN for 50 ms, after POR), that electronic marker can identify itself as SOP", and can latch to that state until a subsequent detach or POR.

In an example implementation, the source 105 electronic marker circuit 215-1 and the sink 110 side electronic marker circuit 215-2 can be identical. Each electronic marker circuit can dynamically self-determine a correct SOP identification (e.g., a source 105 electronic marker circuit 215-1 as SOP' and a sink 110 side electronic marker 215-2 as SOP") after attachment to a device (e.g., coupling the source 105 to the sink 110 via cable assembly 115) without additional communication between the electronic markers. In other words, in the implementation shown in FIG. 2, an additional conductor is not needed because no communication is needed between source 105 electronic marker circuit 215-1 and a sink 110 side electronic marker 215-2. As cable assemblies can vary in length, and as communication typically requires an additional conductor or other communication across the cable assembly, communication between the two electronic markers at opposition sides of the cable assembly increases cost and size (e.g., additional conductor) or complexity (additional communication on existing conductors).

Further, the USB Type-C specification requires VCONN isolation between the source (e.g., source 105) and sink (e.g., sink 110). Typical USB Type-C systems use reverse biased blocking diodes. The example implementation shown in FIG. 2 can provide full isolation between the source 105 VCONN and the sink 110 VCONN by removing the added conductor typically used between them. Further, the example implementation shown in FIG. 2 can be less expensive and simpler to manufacture by removing the additional conductor and by removing some of the elements (e.g., diodes and resistors) in the electronic marker circuits 215-1, 215-2 as compared to typical electronic marker circuits.

Figure 3:
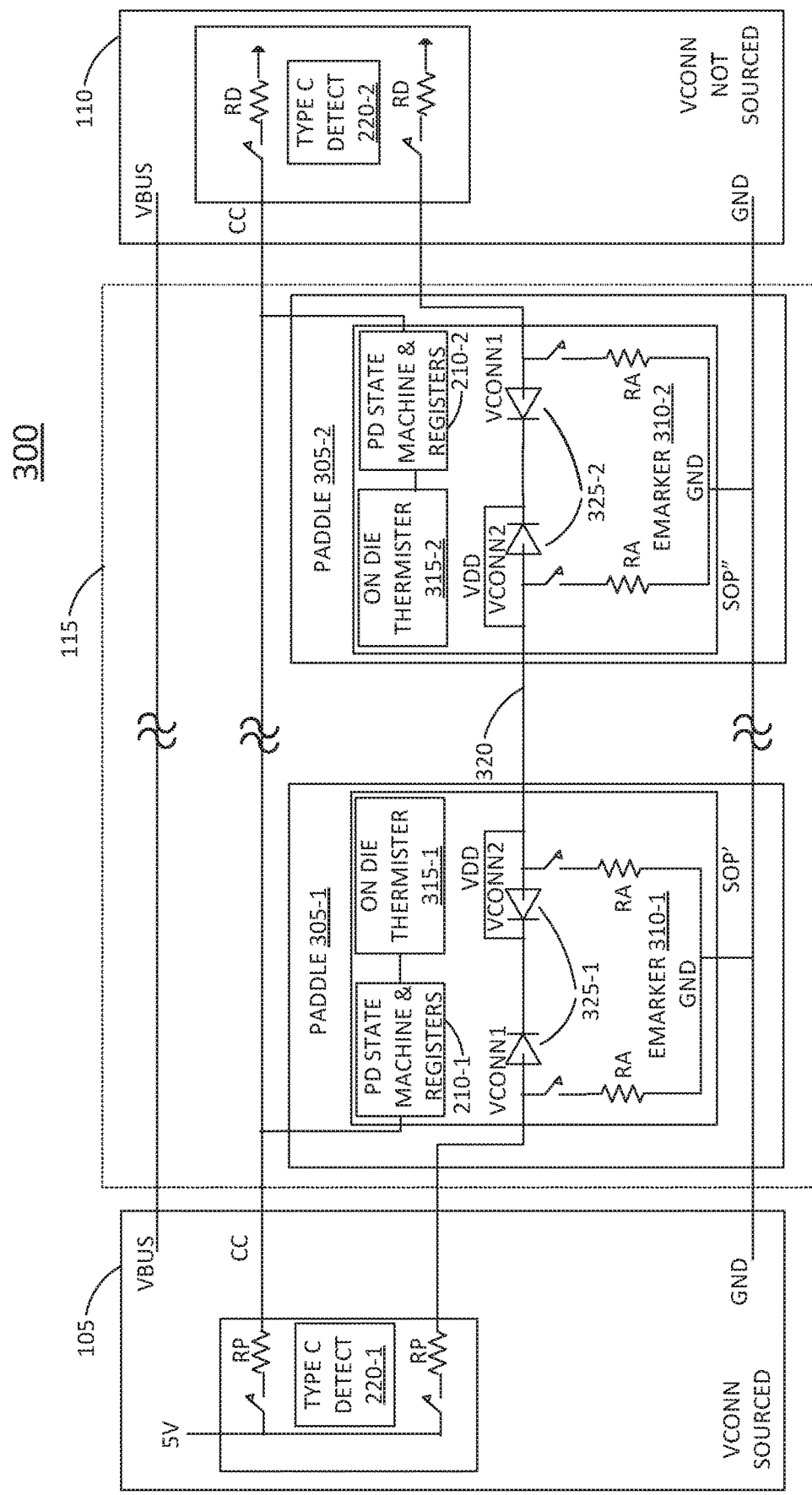
FIG. 3 is a block diagram illustrating a USB Type-C system including a first type of temperature sensor in a cable assembly end according to at least one example embodiment.

FIG. 3 is a block diagram illustrating a USB Type-C system according to at least one example embodiment. In at least the example embodiment shown in FIG. 3, a paddle board can be in approximate thermal equilibrium with a receptacle on the source (e.g., a travel adapter or portable battery) and/or sink (e.g., a laptop or mobile phone). Therefore, due to the thermal characteristics of USB charging systems, temperature sensing during charging can be performed in the cable assembly (e.g., at or near the ends of the cable assembly) used to couple the source to the sink.

As shown in FIG. 3, the USB Type-C system 300 includes the source 105, the sink 110, and the cable assembly 115 coupling the source 105 and the sink 110. The example implementation shown in FIG. 3 includes an on-die thermistor 315-1, 315-2 in the electronic marker circuit 310-1, 310-2 of the paddle board 305-1, 305-2. The configuration shown in FIG. 3 can detect or sense temperature (e.g., temperature changes) more quickly as compared to temperature detection in either the source 105 or the sink 110. The on-die thermistor 315-1, 315-2 can be a resistor configured to sense temperature. In other words, the on-die thermistor 315-1, 315-2 can be a resistor with a resistance dependent on temperature.

Temperature can be sensed by the on-die thermistor 315-1, 315-2. The temperature can be converted to a format that can be stored in the PD state machine and registers 210-1, 210-2. The source 105 and/or the sink 110 can then read the temperature from the PD state machine and registers 210-1, 210-2. For example, the source 105 and/or the sink 110 can poll the PD state machine and registers 210-1 210-2 on a regular time interval. The source 105 and/or the sink 110 can read the temperature from the PD state machine and registers 210-1, 210-2 and use the CC conductor to communicate temperature information. The source 105 and/or the sink 110 can trigger an action based on the temperature. For example, the source 105 and/or the sink 110 can trigger an over-temperature protection action if the temperature exceeds a threshold value.

As shown in FIG. 3, the cable assembly 115 includes a paddle board (PADDLE) 305-1, 305-2 at each end 120-1, 120-2 (e.g., in a connector at each end). The USB Type-C specification states that all Type-C cables rated for greater than 3 A charging is to have electronic marker (Emarker) circuits (e.g., integrated circuits) configured to identify at least one capability (e.g., current capacity, voltage rating) of the cable assembly 115. Accordingly, each paddle board 305-1, 305-2 includes an electronic marker (EMARKER) circuit 310-1, 310-2.

In the implementation shown in FIG. 3, source 105 side electronic marker 310-1 is identified as SOP' and sink 110 side electronic marker 310-2 is identified as SOP'''. After attachment to a device (e.g., coupling the source 105 to the sink 110 via cable assembly 115), a start of packet (SOP) sequence can commence. The SOP sequence includes the source 105 (e.g., as a downstream facing port (DFP)) can apply a Type-C plug power (VCONN) to the electronic marker 310-1 on the source 105 side of the cable assembly 115. According to the USB Type-C specification an electronic marker identifies a coupled device as a source if VCONN1 is detected and as a sink if VCONN2 is detected. The paddle board 305-1, 305-2 and/or the electronic marker circuit 310-1, 310-2 is configured to identify itself as a start of packet type SOP', SOP''' using information about the other of the paddle board 305-1, 305-2 and/or the electronic marker circuit 310-1, 310-2. Accordingly, if the electronic marker 310-1 detects VCONN1, then electronic marker 310-1 identifies itself as SOP'. If electronic marker 310-2 detects VCONN2, then electronic marker 310-2 identifies itself as SOP'''.

According to the USB Type-C specification, SOP' identifies a coupled device as a source and SOP''' identifies a coupled device as a sink. Accordingly, a SOP Packet is a PD packet that starts with an SOP sequence (as defined by the USB Type-C specification). The communication between port partners (e.g., source and sink) uses SOP packets. These packets are not recognized by either cable assembly connector or plug. A SOP' Packet is a PD packet that starts with an SOP' sequence (as defined by the USB Type-C specification) used to communicate with a cable assembly connector or plug. SOP' packets are recognized by the electronics in the cable assembly connector or plug attached to the source (e.g., source 105) and is not recognized by the other cable assembly connector or plug (e.g., sink 110).

A SOP″ Packet is a PD packet that starts with an SOP″ sequence (as defined by the USB Type-C specification) used to communicate with a cable assembly connector or plug when SOP″ packets are being used to communicate with the cable plug at the other end. SOP″ packets are recognized by the electronics in the cable assembly connector or plug attached to the sink (e.g., sink 110) and are not recognized by the other cable assembly connector or plug (e.g., source 105).

The example implementation can be implemented in a typical USB Type-C cable assembly including an added conductor 320. Therefore, the electronic marker 310-1, 310-2 includes a circuit of diodes, switches and resisters that are mirrored. One switch is closed to short current to ground and another switch is open to allow the source 105 side electronic marker 310-1 to power the sink 110 side electronic marker 310-2. The other electronic marker switches are oppositely configured, selected open and/or closed. The diodes 325-1, 325-2 protect the paddle board 305-1, 305-2 by preventing current back leakage.

Figure 4:
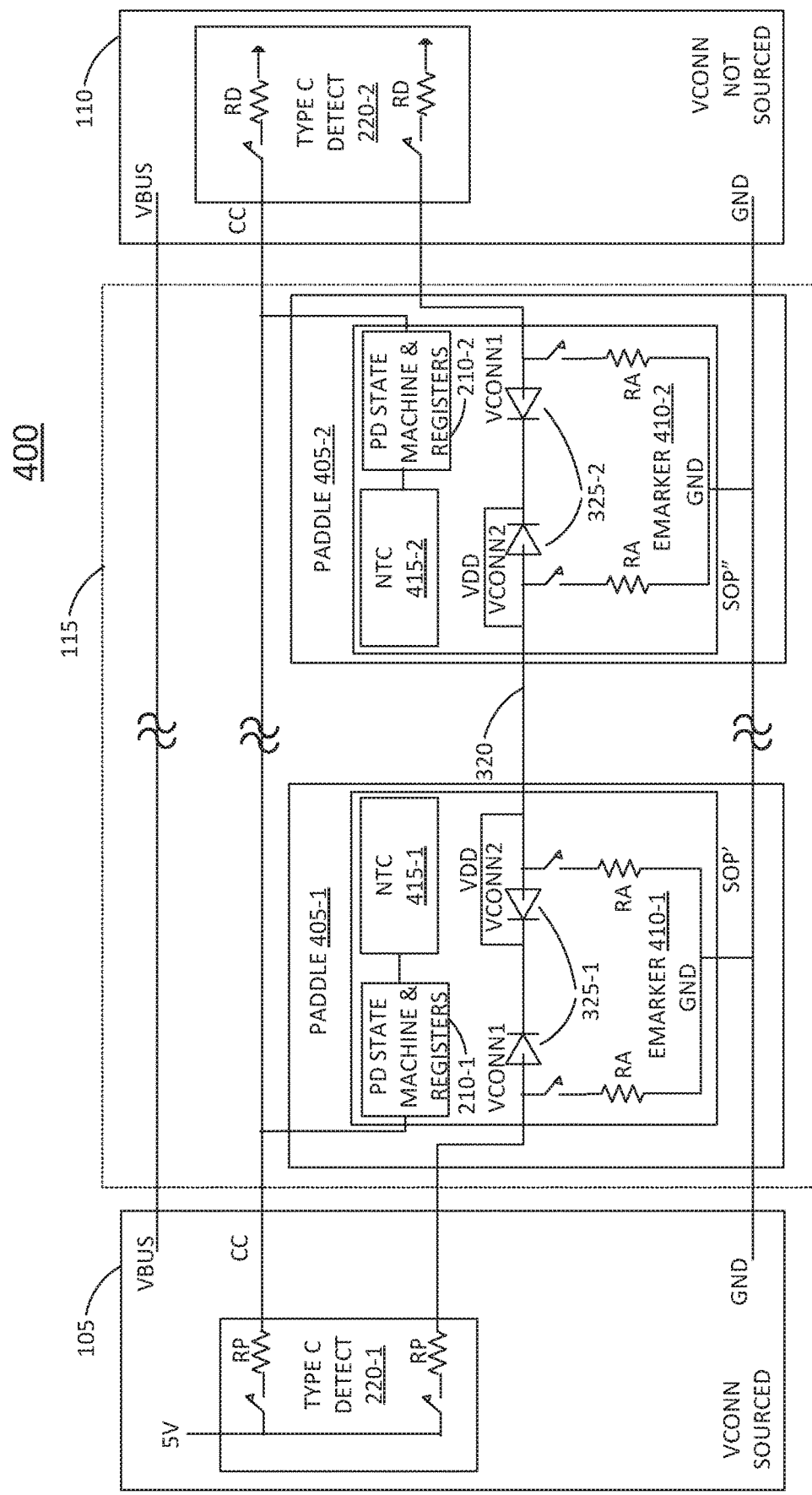
FIG. 4 is block diagram illustrating a USB Type-C system including a second type of temperature sensor in a cable assembly end according to at least one example embodiment.

FIG. 4 is a block diagram illustrating USB Type-C systems according to at least one example embodiment. In at least the example embodiment shown in FIG. 3, a paddle board can be in approximate thermal equilibrium with a receptacle on the source (e.g., a travel adapter or portable battery) and/or sink (e.g., a laptop or mobile phone). Therefore, due to the thermal characteristics of USB charging systems, temperature sensing during charging can be performed in the cable assembly (e.g., at or near the ends of the cable assembly) used to couple the source to the sink. The configuration shown in FIG. 4 can detect or sense temperature (e.g., temperature changes) more quickly as compared to temperature detection in either the source 105 or the sink 110.

As shown in FIG. 4, the USB Type-C system 400 includes the source 105, the sink 110, and the cable assembly 115 coupling the source 105 and the sink 110. The example implementation shown in FIG. 4 includes a negative temperature coefficient (NTC) component 415-1, 415-2 in the electronic marker circuit 410-1, 410-2 of the paddle board 405-1, 405-2. Otherwise, the electronic marker circuit 410-1, 410-2 and the paddle board 405-1, 405-2 operate as described with respect to the electronic marker circuit 310-1, 310-2 and the paddle board 305-1, 305-2, respectively. The NTC 420-1, 420-2 can be a semiconductor material configured to sense temperature. In other words, the NTC 420-1, 420-2 can be a semiconductor material that has been sintered in order to exhibit large changes in resistance in proportion to small changes in temperature.

Temperature can be sensed by the NTC 415-1, 415-2. The temperature can be converted to a format that can be stored in the PD state machine and registers 210-1, 210-2. The source 105 and/or the sink 110 can then read the temperature from the PD state machine and registers 210-1, 210-2. For example, the source 105 and/or the sink 110 can poll the PD state machine and registers 210-1, 210-2 on a regular time interval to read the temperature from the PD state machine and registers 210-1, 210-2 and use the CC conductor to communicate. The source 105 and/or the sink 110 can trigger an action based on the temperature. For example, the source 105 and/or the sink 110 can trigger an over-temperature protection action if the temperature exceeds a threshold value.

As shown in FIG. 4, the cable assembly 115 includes a paddle board (PADDLE) 405-1, 405-2 at each end 120-1, 120-2 (e.g., in a connector at each end). The USB Type-C specification states that all Type-C cables rated for >3 A charging is to have electronic marker (Emarker) circuits (e.g., integrated circuits) configured to identify at least one capability (e.g., current capacity, voltage rating) of the cable assembly 405. Accordingly, each paddle board 405-1, 405-2 includes an electronic marker (EMARKER) circuit 410-1, 410-2.

In the implementation shown in FIG. 4, the source 105 side electronic marker 410-1 is identified as SOP′ and the sink 110 side electronic marker 410-2 is identified as SOP″. The SOP process is described above with regard to FIG. 3.

Figure 5:
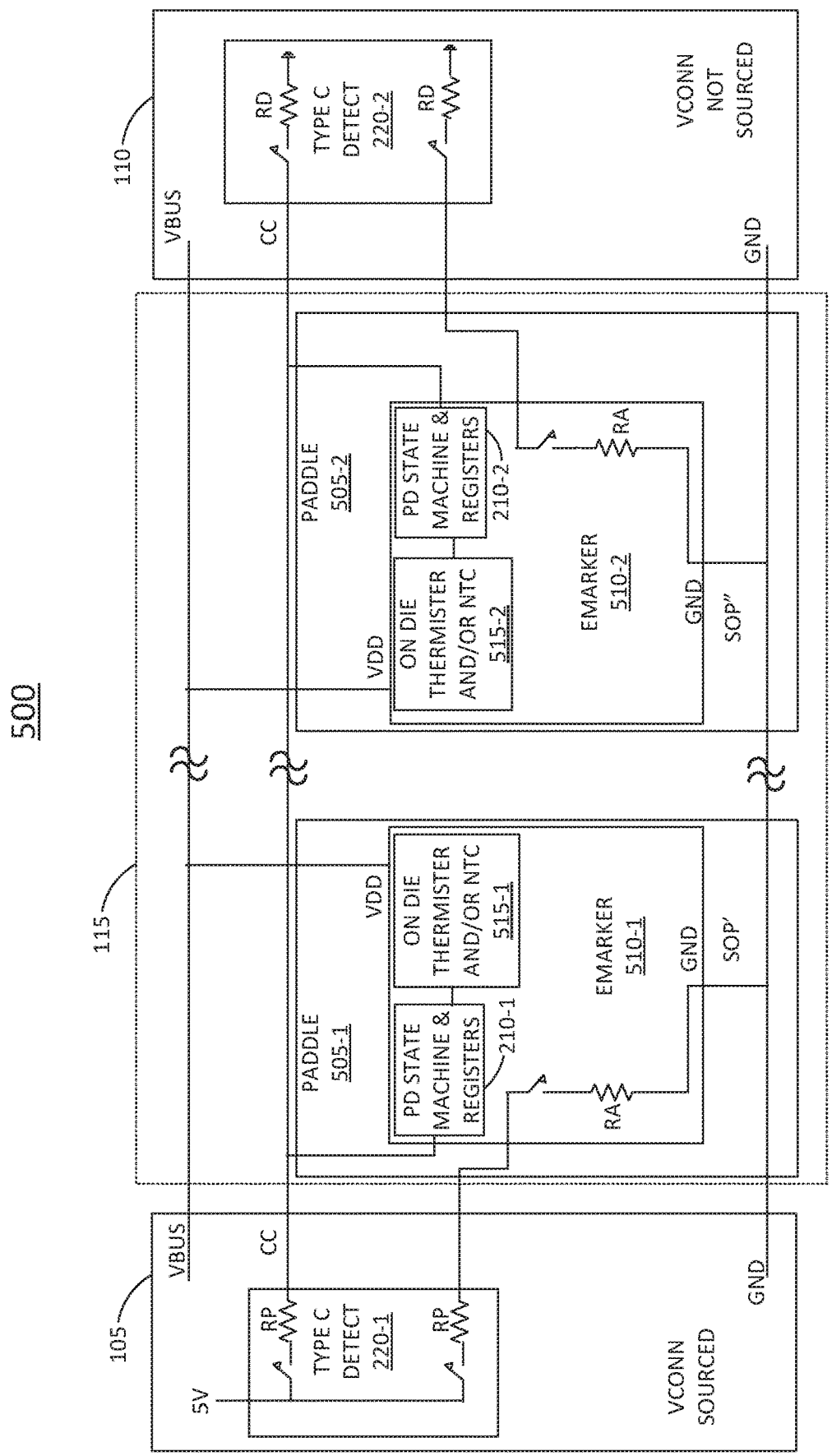
FIG. 5 is a block diagram illustrating a USB Type-C system combining the embodiments of FIG. 2 and FIG. 4 according to at least one example embodiment.

FIG. 5 is a block diagram illustrating USB Type-C systems according to at least one example embodiment. As shown in FIG. 5, the USB Type-C system 500 includes the source 105, the sink 110, and the cable assembly 115 coupling the source 105 and the sink 110. In the implementation shown in FIG. 5, source 105 side electronic marker 510-1 is identified as SOP′ and sink 110 side electronic marker 510-2 is identified as SOP″. The example implementation shown in FIG. 5 includes an on-die thermistor and/or a negative temperature coefficient (NTC) component 515-1, 515-2 in the electronic marker circuit 510-1, 510-2 of the paddle board 505-1, 505-2. Otherwise, the electronic marker circuit 510-1, 510-2 and the paddle board 505-1, 505-2 operate as described with respect to the electronic marker circuit 215-1, 215-2 and the paddle board 210-1, 210-2, respectively. Therefore, the configuration shown in FIG. 5 can detect or sense temperature (e.g., temperature changes) more quickly as compared to temperature detection in either the source 105 or the sink 110.

As mentioned above, temperature sensing during charging can be performed in the cable assembly (e.g., at or near the ends of the cable assembly near a plug). This configuration can detect or sense temperature (e.g., temperature changes) more quickly as compared to temperature detection in either the source (e.g., source 105) or the sink (e.g., sink 110). Therefore, in the example implementation shown in FIG. 5 includes the on-die thermistor and/or the NTC 515-1, 515-2 in the electronic marker circuit 510-1, 510-2.

Temperature can be sensed by the on-die thermistor and/or the NTC 515-1, 515-2. The temperature can be converted to a format that can be stored in the PD state machine and registers 210-1, 210-2. The source 105 and/or the sink 110 can then read the temperature from the PD state machine and registers 210-1, 210-2. For example, the source 105 and/or the sink 110 can poll the PD state machine and registers 210-1, 210-2 on a regular time interval to read the temperature from the PD state machine and registers 210-1, 210-2 and use the CC conductor to communicate. The source 105 and/or the sink 110 can trigger an action based on the temperature. For example, the source 105 and/or the sink 110 can trigger an over-temperature protection action if the temperature exceeds a threshold value.

As shown in FIG. 5, the cable assembly 115 includes a paddle board (PADDLE) 505-1, 505-2 at each end (e.g., in a connector at each end). The USB Type-C specification states that all Type-C cables rated for >3 A charging is to have electronic marker (Emarker) circuits (e.g., integrated circuits) configured to identify at least one capability (e.g., current capacity, voltage rating) of the cable assembly 505. Accordingly, each paddle board 505-1, 505-2 includes an electronic marker (EMARKER) circuit 510-1, 510-2. The SOP process is described above with regard to FIG. 2.

Figure 6:
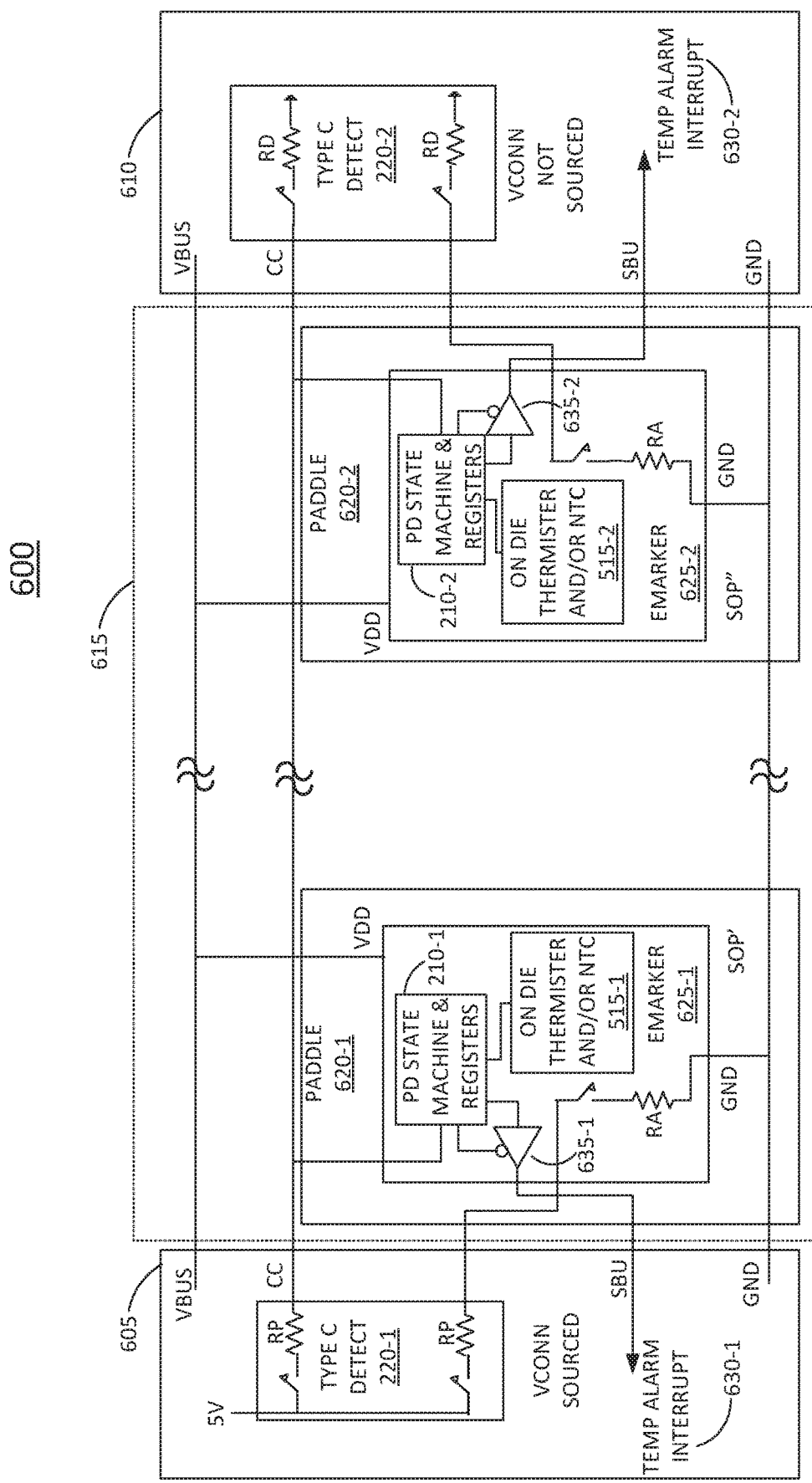
FIG. 6 is a block diagram illustrating a USB Type-C system configured to communicate an alarm or interrupt to a device independent of USB Type-C start of packet (SOP) signaling according to at least one example embodiment.

FIG. 6 is a block diagram illustrating a USB Type-C system according to at least one example embodiment. In a typical source-to-sink communication system, communication is accomplished with SOP signaling. SOP′ and SOP″ communication is typically managed by the source, to avoid collisions. Accordingly, SOP communication supersedes SOP' and SOP" communication. If pollution (e.g., temperature at or exceeding a threshold value) is detected by an electronic marker circuit (e.g., electronic marker circuit 510-1, 510-2), it may take seconds to inform the source or sink, assuming the source or sink is regularly polling SOP' or SOP".

This latency (e.g., delay in informing the source or sink) is driven by the source/sink polling interval. In this example embodiment, in order to improve latency for the announcement of a pollution event (where excessive heat builds), an electronic marker can include a driver (e.g., driver 635-1, 635-2 described below) or other interrupt circuit configured to detect a pollution event in the electronic marker. Further, the electronic marker can separately provide the interrupt to a source interrupt (e.g., temperature alarm interrupt 630-1) or a sink interrupt (e.g., temperature alarm interrupt 630-2). For example, the interrupt can be communicated separately from the SOP signaling (e.g., signaling over a sideband use (SBU) conductor rather than a configuration channel (CC) conductor).

As shown in FIG. 6, the USB Type-C system 600 includes a source 605, a sink 610, and a cable assembly 615 coupling the source 605 and the sink 610. The cable assembly 615 is a reversible cable assembly. For example, the cable assembly 615 has two ends either of which can be connected to the source 605 or the sink 610. The cable assembly 615 further includes a paddle board (PADDLE) 620-1, 620-2 at each end (e.g., in a connector at each end). The USB Type-C specification states that all Type-C cables rated for >3 A charging is to have electronic marker circuits (e.g., integrated circuits) configured to identify at least one capability (e.g., current capacity, voltage rating) of the cable assembly 615. Accordingly, each paddle board 620-1, 620-2 includes an electronic marker (EMARKER) circuit 625-1, 625-2.

In the implementation shown in FIG. 6, the source 605 side electronic marker 625-1 is identified as SOP' and the sink 610 side electronic marker 625-2 is identified as SOP". The SOP process is described above with regard to FIG. 2.

Temperature can be sensed by the on-die thermistor and/or the NTC 515-1, 515-2. The temperature can be converted to a format that can be stored in the PD state machine and registers 210-1, 210-2. The electronic marker circuit 625-1, 625-2 includes an interrupt circuit 635-1, 635-2. The interrupt circuit 635-1, 635-2 can be configured to compare the stored temperature to a temperature threshold value each stored in the PD state machine and registers 210-1, 210-2. If the stored temperature to a temperature threshold value, the interrupt circuit 635-1, 635-2 can be configured to communicate an alarm to a temperature alarm interrupt 630-1, 630-2 on the source 605 and/or the sink 610. The temperature alarm interrupt 630-1, 630-2 can trigger an action based on the temperature. For example, the temperature alarm interrupt 630-1, 630-2 can trigger an over-temperature protection action.

In an example implementation, the electronic marker circuit 625-1, 625-2 can measure temperature with the on-die thermistor and/or a negative temperature coefficient (NTC) component 515-1, 515-2 and assert an alarm or interrupt using the interrupt circuit 635-1, 635-2 if the temperature exceeds a threshold (e.g., >SOC, etc.). With cooperation of source 605 or sink 610 hardware, one or more of the USB Type-C pins (e.g., an SBU contact (e.g., SBU1, SBU2) or one or more other contacts) can be used to transmit the alarm or interrupt across the mated USB Type-C plug and receptacle to one or more of the source 605 or sink 610.

In an example, the alarm can be tristated (e.g., on, off, high impedance). Therefore, a high impedance state can be selected by default, so that it does not load down and sensitive circuitry connected to the repurposed USB Type-C pin (e.g., the SBU contact) in the source 605 or sink 610. While charging, the electronic marker circuit 625-1, 625-2 can be configured to enable the alarm or interrupt.

In an example, removing the alarm or interrupt communication from the SOP communication channel can further remove the burden for the source or sink to regularly poll the pollution detect capable electronic marker circuit in the cable. This can reduce communication burden and increase efficiency during fast charging with dynamic load requirements, as the communication can more quickly adapt to changing load conditions, increasing efficiency and reducing excessive heat production.

In an example, the alarm or interrupt can further be used to reflect other measurements by the electronic marker circuit or one or more circuits associated with the cable, the paddle board, or the electronic marker circuit, such as VBUS voltage measurements, CC voltage, etc. Further, on the source or the sink side, the alarm or interrupt is not limited to interrupting a processor of the sink or source. In other examples, the alarm or interrupt can control a load switch or a FET, for example, to open VBUS or the CC path to the sink or the source, resulting in an immediate detach of the power delivery (PD) protocol.

Although not shown, a temperature sensor can also be included on the source 105, 605 and/or the sink 110, 610 in any of the described implementations. Further, the implementation shown in FIG. 6, the measured temperature can also be stored in the PD state machine and registers 210-1, 210-2 and polled as described with regard to FIG. 5 (e.g., as a back-up to the alarm or interrupt implementation).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms "a", "an", and "the" are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A paddle board of a reversible universal serial bus (USB) cable assembly, the paddle board comprising:
   an electronic marker circuit configured to indicate at least one capability of the reversible USB cable assembly to a device coupled to the reversible USB cable assembly and to select the device as one of a source or a sink, the paddle board configured to be powered by the device;
   a register configured to store at least one variable value associated with at least one of the cable assembly and the paddle board;
   a temperature sensor configured to sense a temperature of the paddle board as a temperature of the device and configured to store a value indicating the sensed temperature in the register; and an interrupt circuit configured to compare the value to a threshold value that corresponds to an over temperature of the device, and based on the comparison, to communicate an alarm to the device over a sideband use conductor of the reversible USB cable assembly when the value exceeds the threshold value.

2. The paddle board of claim 1, wherein the temperature sensor uses at least one of a resistor and a semiconductor material with a resistance that is dependent on temperature.

3. The paddle board of claim 1, wherein the paddle board is compliant with a USB Type-C specification.

4. A cable assembly, comprising:
a first paddle board configured to indicate at least one capability of the cable assembly to a first device and select the first device as one of a source or a sink, the first paddle board configured to be powered via a bus voltage, the first paddle board including:
   a first temperature sensor configured to sense a first temperature of the first paddle board as a temperature of the first device;
   a first register configured to store a first value indicating the first temperature of the first temperature sensor; and
   a first interrupt circuit configured to compare the first value to a first threshold value and based on the comparison, communicate an alarm to the first device over a sideband use conductor of the cable assembly when the first value exceeds the first threshold value, the first threshold value corresponding to an over temperature of the first device; and
a second paddle board configured to indicate at least one capability of the cable assembly to a second device and select the second device as one of the source or the sink, the second paddle board configured to be powered via the bus voltage, the second paddle board including:
   a second temperature sensor configured to sense a second temperature of the second paddle board as a temperature of the second device;
   a second register configured to store a second value indicating the second temperature of the second temperature sensor; and
   a second interrupt circuit configured to compare the second value to a second threshold value and based on the comparison, communicate an alarm to the second device over the sideband use conductor of the cable assembly when the second value exceeds the second threshold value, the second threshold value corresponding to an over temperature of the second device.

5. The cable assembly of claim 4, wherein:
the first paddle board includes a first electronic marker circuit;
the second paddle board includes a second electronic marker circuit;
the cable assembly excluding a conductor coupled between the first electronic marker circuit and the second electronic marker circuit;
the first paddle board is configured to identify itself as a first start of packet type without receiving information from the second electronic marker circuit; and
the second paddle board is configured to identify itself as a second start of packet type without receiving information from the first electronic marker circuit.

6. The cable assembly of claim 4, wherein:
the first register is configured to be read by the first device; and
the second register is configured to be read by the second device.

7. The cable assembly of claim 4, wherein the cable assembly is reversible.

8. The cable assembly of claim 4, wherein the cable assembly is compliant with a USB Type-C specification.

* * * * *